United States Patent [19]
Young

[11] 3,730,547
[45] May 1, 1973

[54] SHEET TRUCK AND THE LIKE
[75] Inventor: John E. Young, Middletown, Ohio
[73] Assignee: Armco Steel Corporation, Middletown, Ohio
[22] Filed: May 28, 1971
[21] Appl. No.: 147,770

[52] U.S. Cl. .............................. 280/116, 280/150 C
[51] Int. Cl. ................................................ B60p 9/00
[58] Field of Search .................... 280/8, 85, 113, 114, 280/116, 499, 503, 150 C, 432, 475

[56] References Cited

UNITED STATES PATENTS 2,570,674   10/1951   Haywood ................................ 280/8

*Primary Examiner*—Philip Goodman
*Attorney*—Melville, Strasser, Foster and Hoffman

[57] ABSTRACT

This application discloses an improved truck for moving sheets of steel, coils of steel and the like, from place to place in a plant. The truck is basically a fifth wheel steering, four wheeled truck. An outrigger or skid is secured to the front axle assembly at right angles to the axle and has a length substantially equal to the track of the front wheels of the truck. When the tongue of the truck is moved to turn the front wheels to a position in which the axle is parallel to the centerline of the truck, the outrigger occupies substantially the position of the wheels when the tongue is straight forward. The outrigger is positioned, say, a half inch above floor level so that its stabilizing effect comes into play upon a very slight tilt of the truck.

5 Claims, 5 Drawing Figures

PATENTED MAY 1 1973 3,730,547

INVENTOR/S
JOHN E. YOUNG

BY *Melville, Strasser, Foster and Hoffman*
ATTORNEYS

SHEET TRUCK AND THE LIKE

BRIEF SUMMARY OF THE INVENTION

The typical truck used in plants for transporting heavy loads, such as sheets or coils of steel, from place to place, is a fifth wheel steering four wheeled truck. The truck has a tongue or draw bar by means of which it is towed or pushed and by means of which the fifth wheel is turned to steer the front wheels of the truck. In a truck of this type, it is possible, and often necessary, to move the tongue to a position at right angles to the axis of the truck body; and when this is done, the front axle is parallel to the truck body axis, so that the front of the truck is supported only in the center. With a heavy load on the truck, if the load is not properly centered, the truck is prone to tip over, dislodging the load of steel, with great danger, and possible serious injury to personnel in the vicinity, to say nothing of damage to the truck, to the load, or to adjacent machinery or the like. While the most unstable position is with the axle parallel to the truck axis, stability is reduced whenever the tongue is turned from a straight ahead position.

According to the present invention, an outrigger or skid structure is associated with the front axle assembly of the truck. This outrigger is arranged at right angles to the front axle, and has a length substantially equal to the track, i.e. the distance between the outside of the front wheels. It is disposed so that it is only a short distance, say, one-half inch, above the floor. Thus, if the front wheels of the truck are turned to a point where the axle is parallel to the truck body axis, the outrigger will occupy the former position of the front wheels transversely of the truck body axis. By virtue of its position close to the floor, a very slight tilt of the truck brings it into play. An additional safety feature of this construction resides in the fact that if a load is placed on the truck improperly, the tongue becomes very difficult to turn, thus giving a warning that the load should be rebalanced on the truck.

DETAILED DESCRIPTION

Figure 1A:
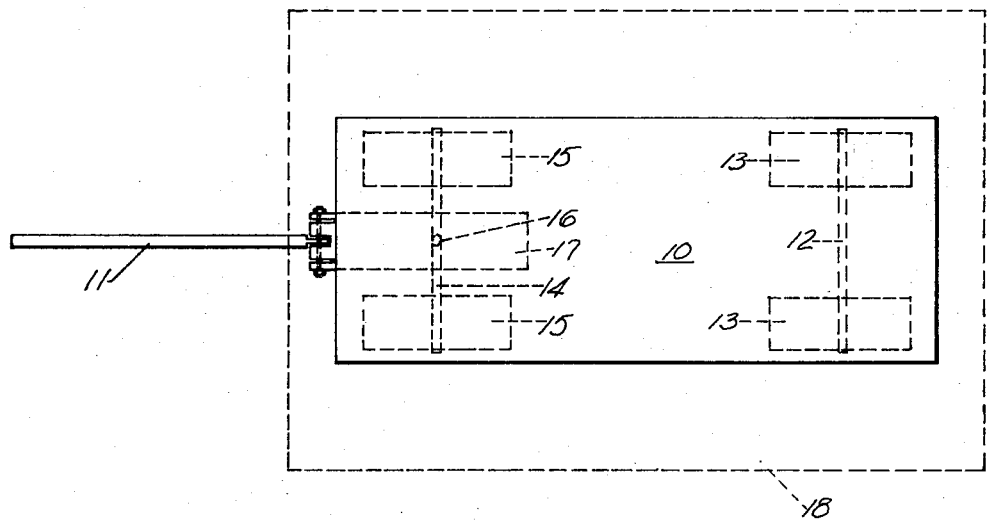
FIG. 1A is a diagrammatic plan view of a typical sheet truck with the wheels, axles and outrigger shown in broken lines and with a typical sheet load also shown in broken lines.
Figure 1B:
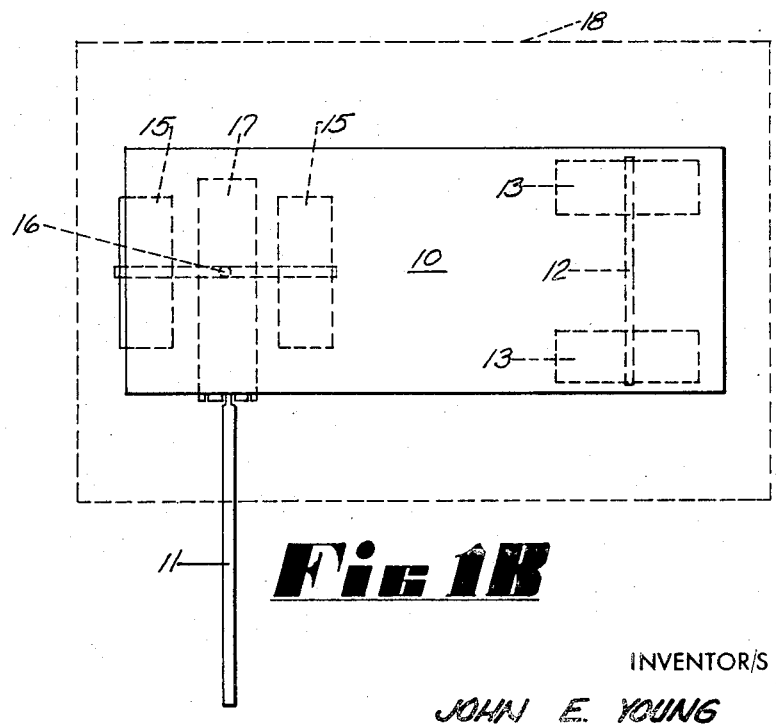
FIG. 1B is a view similar to FIG. 1A but showing the situation with the tongue turned at right angles to the axis of the truck.

Referring first to FIGS. 1A and 1B, the body of the sheet truck is indicated generally at 10 and it is provided with the tongue 11 by means of which it can be towed or pushed. The truck is provided with a rear axle 12 and rear wheels 13. The front axle 14 carries the wheels 15 and the axle is capable of being turned for steering by movement of the tongue 11 about the point 16. The outrigger is shown in broken lines at 17.

An examination of these two Figures will readily demonstrate that in the position of FIG. 1A when the truck is being towed along a straight path, there is in effect four point support for the load on the two wheels 13 and the two wheels 15. However, when the tongue is turned to the position shown in FIG. 1B, the front axle 14 is parallel to the axis of the truck so that in effect there is support along the axis of the wheels 15 and the two wheels 13. This is in effect an isosceles triangular support.

In both of these Figures, a typical over-sized sheet load is indicated in broken lines at 18. From a consideration of FIG. 1B, it is evident that if the load 18 is slightly off balance, the tendency will be for the load to tilt the truck about the axis of the wheels 15; and of course if this happens, the load falls off the truck and gives rise to the dangers above outlined.

Figure 2:
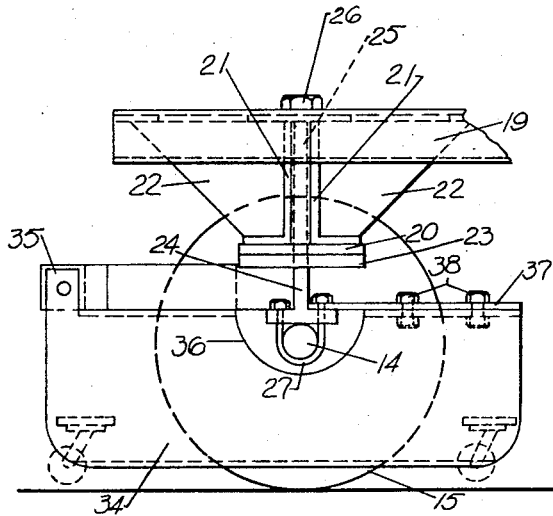
FIG. 2 is an enlarged detailed view showing the front axle assembly and the mounting of the outrigger as viewed axially of the front axle.
Figure 3:
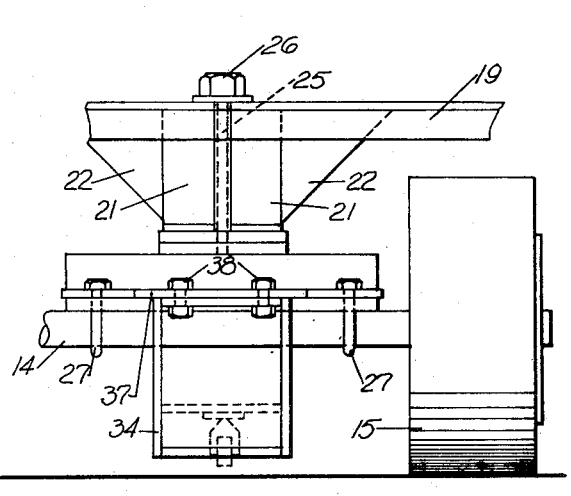
FIG. 3 is a view similar to FIG. 2 but as seen from the right of FIG. 2.
Figure 4:
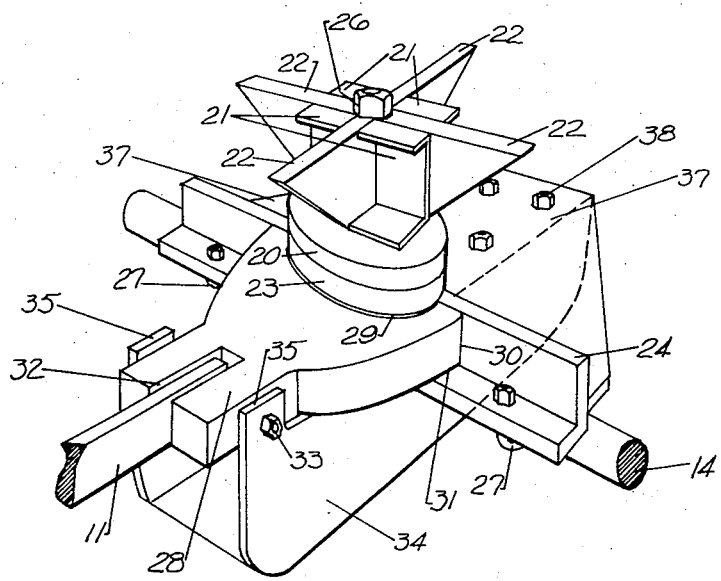
FIG. 4 is a perspective view of the same as seen from the tongue end of the structure.

Referring now to FIGS. 2, 3, and 4, the mounting of the axle assembly will be described in more detail. The framework of the truck body is indicated at 19. The upper bearing surface of the fifth wheel is indicated at 20. It is secured to the underside of the truck body by means of two channels 21 which are welded both to the upper bearing surface 20 of the fifth wheel and to the underside of the truck body 19. Bracing is provided by means of the four gussets or webs 22 which are also welded to the channel members 21 and to the underside of the truck body 19.

The lower bearing surface of the fifth wheel is indicated at 23 and to the underside thereof is welded the heavy T bar 24. It will be understood that both bearing surfaces 20 and 23 have a hole therethrough for the passage of the king pin 25 which is suitably secured to the T bar 24. A nut 26 holds the fifth wheel assembly together. The axle 14 is secured to the T bar 24 by means of the U bolts 27 and of course the wheels 15 are mounted on the axle 14.

The yoke 28 for the tongue 11 is of a configuration best seen in FIG. 4. It has the semi-circular clearance 29 to pass around the bearing plates 23 and 20 and it is welded to the T bar 24 at 30 and 31. At its front end it has a mortise 32 to admit the tongue 11 which is held in place by a pin 33.

The outrigger member, generally indicated at 34, is of a generally box-like cross section as best seen in FIG. 3 and has the upstanding ears 35 at its forward end which are provided with perforations so that the front of the outrigger and the tongue and the yoke are secured together.

The side walls of the outrigger 34 are relieved as at 36 to clear the axle 14, and the outrigger at its rear end is secured to a brace plate 37 by means of bolts 38. The U bolts 27 also assist in mounting the brace plate 37 to the T bar.

From this description, it will be seen that a very simple structure is provided which may be applied to an existing sheet truck with a minimum of difficulty. The important point involved is that the length of the outrigger member 34 is substantially the same as the track of the wheels 15 so that when the tongue is turned as in FIG. 1B, the outrigger will give substantially the same stability as would the wheels if they were in straight position.

It is desirable that a very small floor clearance be provided for the outrigger. A height of about one-half inch above the floor has been found very satisfactory because it will prevent tilting to the point where the load will start to slide. Additionally, this close floor clearance inherently provides a warning if a load is improperly placed on the truck, in that one end or the other of the outrigger will tend to scrape along the floor and make it difficult to turn the tongue. When this condition is found, the operator is warned that the load is not properly centered and that he should rebalance it. Casters may be provided near the front and back of the outrigger with a similar clearance to minimize friction when a ramp or other incline is encountered. This is shown diagrammatically in FIGS. 2 and 3 in broken lines. It will be understood that when such casters are provided, the bottom of the outrigger 34 must be relieved to permit castering action.

The details described herein have been by way of example only and it will be understood that many modifications may be made without departing from the spirit of the invention. Therefore, no limitation not expressly set forth in the claims is intended or should be implied.

The embodiments of the invention in which an exclusive property or privilege is claimed are defined as follows:

1. In a four wheeled sheet truck and the like, having an axle assembly steerable by means of a fifth-wheel arrangement, said axle having a wheel adjacent each end thereof; an outrigger member rigidly secured to said axle assembly substantially centrally of said axle, said outrigger member being of a length substantially equal to the track of the wheels on said axle, and being disposed at right angles to said axle, and extending substantially an equal distance from said axle in both directions.

2. The structure of claim 1, wherein the bottom of said outrigger member is spaced from the floor by a distance on the order of one-half inch.

3. The structure of claim 1, wherein said outrigger member is of a box-like construction of steel plates welded together, and providing a smooth bottom surface.

4. The structure of claim 1, wherein a caster is provided at each outboard end of said outrigger member.

5. The structure of claim 4, wherein said casters are normally spaced on the order of one-half inch from the floor.

* * * * *